United States Patent
Fujita et al.

(10) Patent No.: US 9,903,500 B2
(45) Date of Patent: Feb. 27, 2018

(54) ELECTROMAGNETIC VALVE

(71) Applicants: HONDA MOTOR CO., LTD., Tokyo (JP); NIDEC TOSOK CORPORATION, Zama-shi, Kanagawa (JP)

(72) Inventors: Akira Fujita, Haga-gun (JP); Hiroaki Ue, Utsunomiya (JP); Fumio Kai, Zama (JP); Tomohiro Yasuda, Zama (JP)

(73) Assignees: HONDA MOTOR CO., LTD., Tokyo (JP); NIDEC TOSOK CORPORATION, Zama-Shi (JP)

(*) Notice: Subject to any disclaimer, the term of this patent is extended or adjusted under 35 U.S.C. 154(b) by 0 days.

(21) Appl. No.: 15/365,099

(22) Filed: Nov. 30, 2016

(65) Prior Publication Data
US 2017/0159844 A1    Jun. 8, 2017

(30) Foreign Application Priority Data
Dec. 3, 2015  (JP) .................................. 2015-236927

(51) Int. Cl.
*F16K 31/08* (2006.01)
*F16K 31/06* (2006.01)
(Continued)

(52) U.S. Cl.
CPC .......... *F16K 31/082* (2013.01); *F16K 27/029* (2013.01); *F16K 31/0665* (2013.01);
(Continued)

(58) Field of Classification Search
CPC .. F16K 31/082; F16K 27/029; F16K 31/0679; F16K 31/0665; H01F 7/1615;
(Continued)

(56) References Cited

U.S. PATENT DOCUMENTS

| | | | | |
|---|---|---|---|---|
| 5,752,689 A | * | 5/1998 | Barkhimer | .......... F16K 31/0665 251/129.14 |
| 5,947,155 A | * | 9/1999 | Miki | .................. G05D 16/2013 335/229 |

(Continued)

FOREIGN PATENT DOCUMENTS

JP       2002-250457       9/2002

*Primary Examiner* — John Bastianelli
(74) *Attorney, Agent, or Firm* — Rankin, Hill & Clark LLP

(57) ABSTRACT

A self-holding electromagnetic valve includes: a solenoid having a tubular guide part having the same center as a central axis extending in an axial direction; a axially movable element located radially inside the guide part; a cover housing the solenoid and the movable element, having a hole portion, and made of a magnetic material; a pin located at the hole portion and movable along with movement of the movable element; and a valve section provided outside the cover and opened/closed along with movement of the movable element and the pin. The solenoid has a cylindrical part with an inner circumferential surface that receives the guide part, tooth parts that extend radially outward from the cylindrical part and are made of a magnetic material, bobbin parts provided each tooth part, and coils wound around the bobbin parts.

8 Claims, 8 Drawing Sheets

(51) Int. Cl.
 *H01F 7/121* (2006.01)
 *H01F 7/16* (2006.01)
 *F16K 27/02* (2006.01)
 *H01F 7/08* (2006.01)

(52) U.S. Cl.
 CPC ......... *F16K 31/0679* (2013.01); *H01F 7/081* (2013.01); *H01F 7/121* (2013.01); *H01F 7/1615* (2013.01); *H01F 7/1646* (2013.01); *H01F 2007/086* (2013.01)

(58) Field of Classification Search
 CPC ........ H01F 7/081; H01F 7/121; H01F 7/1646; H01F 2007/086
 USPC .................... 251/65, 129.15, 129.19, 129.14; 335/229, 279, 281, 297
 See application file for complete search history.

(56) References Cited

U.S. PATENT DOCUMENTS

| | | | | |
|---|---|---|---|---|
| 6,598,852 B2* | 7/2003 | Tomoda | ............... | F16K 31/0631 251/129.19 |
| 7,388,461 B2* | 6/2008 | Ryuen | ................. | F16K 31/0631 335/261 |
| 7,641,171 B2* | 1/2010 | Chinda | ................. | F16K 11/044 251/65 |
| 8,127,791 B2* | 3/2012 | Najmolhoda | ......... | F16K 31/062 251/65 |

\* cited by examiner

ELECTROMAGNETIC VALVE

CROSS-REFERENCE TO RELATED APPLICATION

Priority is claimed on Japanese Patent Application No. 2015-236927, filed on Dec. 3, 2015, the contents of which are incorporated herein by reference.

BACKGROUND OF THE INVENTION

Field of the Invention

The present invention relates to an electromagnetic valve.

Description of Related Art

An electromagnetic valve equipped with a permanent magnet is disclosed, for instance, in Japanese Unexamined Patent Application, First Publication No. 2002-250457. The electromagnetic valve of Japanese Unexamined Patent Application, First Publication No. 2002-250457 is provided with a coil spring, and thereby is realized as a self-holding electromagnetic valve that maintains a valve-opened state or a valve-closed state in a state in which a current carried to a coils member is obstructed.

SUMMARY OF THE INVENTION

In the electromagnetic valve provided with the coil spring, there is a concern that the coil spring suffers from jamming or stranding. When the coil spring suffers from jamming or stranding, there is a problem in that a force of the coil spring which is given to the valve is made unstable and stable opening/closing of the valve is made impossible. Moreover, the coil spring is provided, which leads to a problem in that the electromagnetic valve is easily enlarged.

In view of the above problems, an aspect of the present invention is directed to providing a self-holding electromagnetic valve that has a structure capable of reducing a size and can be stably opened/closed.

An aspect of an electromagnetic valve of the present invention includes: a solenoid having a tubular guide part having the same center as a central axis extending in an axial direction; a movable element located inside the guide part in a radial direction and configured to move in the axial direction; a cover configured to house the solenoid and the movable element, having a hole portion, and made of a magnetic material; a pin located at the hole portion and configured to move along with movement of the movable element; and a valve section provided outside the cover and opened/closed along with movement of the movable element and the pin. The movable element has a permanent magnet having magnetic poles different from each other in the axial direction, and a pair of yokes disposed at opposite sides of the permanent magnet in the axial direction. The solenoid has a cylindrical part in which the guide part is provided for an inner circumferential surface thereof, a plurality of tooth parts that extend outward from the cylindrical part in the radial direction and are made of a magnetic material, bobbin parts provided for the respective tooth parts, and coils wound around the bobbin parts. Each of the bobbin parts has a flange part bent along an outer circumferential surface of the cylindrical part in an arcuate shape.

According to an aspect of the present invention, the self-holding electromagnetic valve has a structure capable of reducing a size because a coil spring is not used, and can be stably opened/closed.

DETAILED DESCRIPTION OF THE INVENTION

Figure 1:
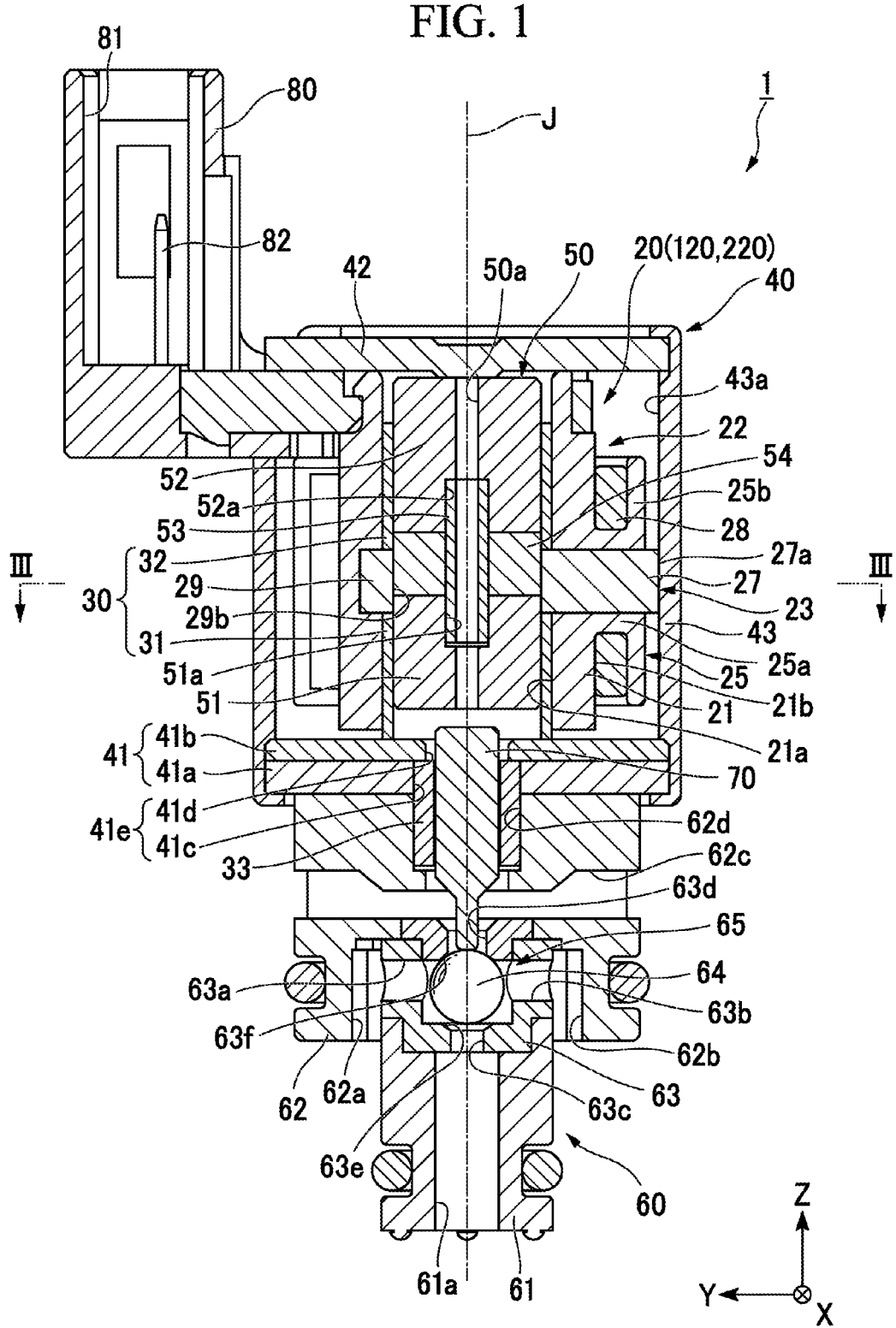
FIG. 1 is a cross-sectional view illustrating an electromagnetic valve of a first embodiment, and illustrates a state in which a valve section is opened.

Hereinafter, an electromagnetic valve according to an embodiment of the present invention will be described with reference to the drawings. The scope of the present invention is not limited to the following embodiment, but the embodiment can be arbitrarily modified without departing from the technical spirit of the present invention. An actual structure and each structure may be different from each other in scale or number in the following drawings to facilitate understanding of each constitution.

In the drawings, an XYZ coordinate system is shown as a proper three-dimensional orthogonal coordinate system. In the XYZ coordinate system, a Z-axial direction is set as a direction parallel to an axial direction of a central axis J illustrated in FIG. 1. A Y-axial direction is set as one of directions perpendicular to the Z-axial direction, i.e. a leftward/rightward direction in FIG. 1. An X-axial direction is set as a direction orthogonal to both the Z-axial direction and the Y-axial direction.

In the following description, a negative side (a −Z side or one side in the axial direction) in the Z-axial direction is referred to as a "lower side," and a positive side (a +Z side or the other side in the axial direction) in the Z-axial direction is referred to as an "upper side." The lower and upper sides are merely terms used for description, and do not limit an actual positional relationship or an actual direction. Moreover, unless specifically defined otherwise, the direction (the Z-axial direction) parallel to the central axis J is merely referred to as an "axial direction," a radial direction, the center of which is on the central axis J, is merely referred to as the "radial direction," and a circumferential direction, the center of which is on the central axis J, is merely referred to as the "circumferential direction."

First Embodiment

Figure 2:
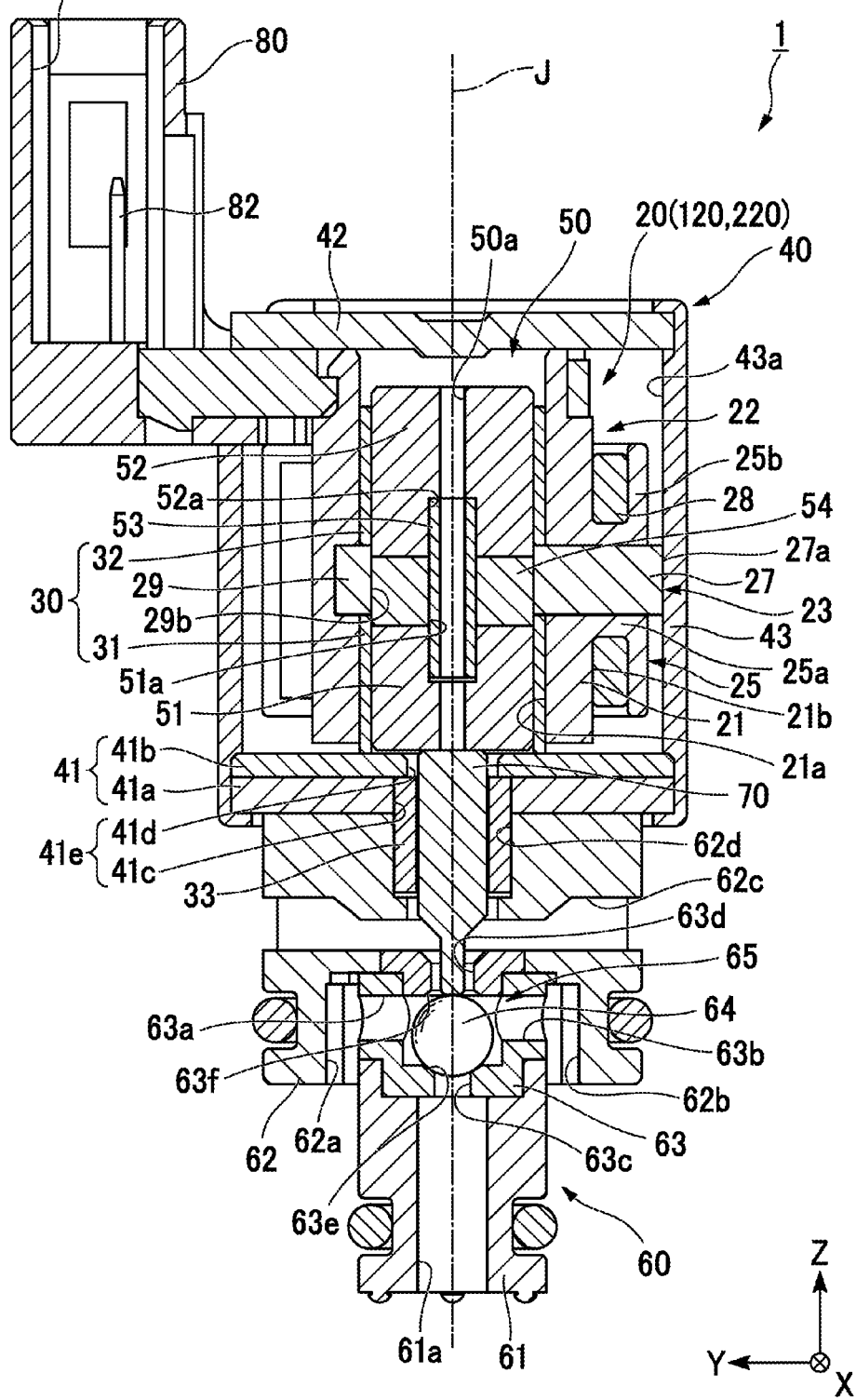
FIG. 2 is a cross-sectional view illustrating the electromagnetic valve of the first embodiment, and illustrates a state in which a valve section is closed.

FIGS. 1 and 2 are cross-sectional views illustrating an electromagnetic valve 1 of a first embodiment. FIG. 1 illustrates a state in which a valve section 60 is opened. FIG. 2 illustrates a state in which the valve section 60 is closed.

As illustrated in FIGS. 1 and 2, the electromagnetic valve 1 of the present embodiment is provided with a cover 40, a pin guide member 33, a solenoid 20, a movable element 50, a valve section 60, and a pin 70. In the electromagnetic valve 1, as the solenoid 20 is supplied with a current, a thrust force caused by a magnetic force is applied to the movable element 50, and the movable element 50 moves in the axial direction. The pin 70 moves along with the movement of the movable element 50. The valve section 60 is opened or closed along with the movement of the movable element 50 and the pin 70. Hereinafter, a constitution of each section will be described in detail.

[Cover]

The cover 40 houses the solenoid 20 and the movable element 50. The cover 40 is made of a magnetic material. The cover 40 has a tubular part 43, a lower plate (a plate) 41, and an upper plate (a plate) 42.

The tubular part 43 has a tubular shape covered from an outer side of the solenoid 20 in the radial direction. In the present embodiment, the tubular part 43 is, for instance, in a cylindrical shape having the same center as the central axis J.

The lower plate 41 is located at a lower side (a −Z side) of the solenoid 20. The lower plate 41 is attached to the tubular part 43. In the present embodiment, the lower plate 41 is, for instance, fitted inside the tubular part 43.

In the present embodiment, the lower plate 41 is made up of, for instance, two plates. That is, the lower plate 41 has a first lower plate 41a and a second lower plate 41b. The second lower plate 41b is stacked on an upper side (a +Z side) of the first lower plate 41a. A shape of the first lower plate 41a and a shape of the second lower plate 41b viewed in the axial direction (the Z-axial direction) have, for instance, circular shapes.

The first lower plate 41a is provided with a first hole portion 41c that passes through the first lower plate 41a in the axial direction (the Z-axial direction). The second lower plate 41b is provided with a second hole portion 41d that passes through the second lower plate 41b in the axial direction (the Z-axial direction). A hole portion 41e that passes through the lower plate 41 in the axial direction (the Z-axial direction) is defined by the first and second hole portions 41c and 41d. That is, the cover 40 is provided with the hole portion 41e. The first and second hole portions 41c and 41d are, for instance, in a circular shape having the same center as the central axis J. The second hole portion 41d has a smaller diameter than the first hole portion 41c.

The upper plate 42 is located at an upper side (a +Z side) of the solenoid 20. The upper plate 42 is attached to the tubular part 43. In the present embodiment, the upper plate 42 is, for instance, fitted inside the tubular part 43. A shape of the upper plate 42 viewed in the axial direction (the Z-axial direction) is, for instance, a circular shape.

According to the present embodiment, the cover 40 has the pair of plates (the lower plate 41 and the upper plate 42) that are located at respective ends of the solenoid 20 in the axial direction. Moreover, the lower plate 41, the upper plate 42, and the tubular part 43 are separate members. For this reason, when the electromagnetic valve 1 is assembled, the solenoid 20 and the movable element 50 are easily housed inside the cover 40. Thus, the electromagnetic valve 1 can be easily assembled.

A connector section 80 is attached to a lateral surface of the cover 40. The connector section 80 is provided with a connector opening 81 that is open at the upper side (the +Z side). The connector section 80 has a connecting terminal 82. One end of the connecting terminal 82 protrudes from a bottom surface of the connector opening 81. Although not illustrated, the other end of the connecting terminal 82 is electrically connected to the coils 28 of the solenoid 20. An external power supply (not shown) is connected to the connector section 80. The external power supply supplies a current to the coils 28 via the connecting terminal 82.

[Pin Guide Member]

The pin guide member 33 is a tubular member supported by the cover 40. The pin guide member 33 is made of a non-magnetic material. The pin guide member 33 is fitted into the first hole portion 41c of the first lower plate 41a. An upper end of the pin guide member 33 is in contact with a lower surface of the second lower plate 41b.

The pin guide member 33 is, for instance, open at opposite ends thereof in the axial direction (the Z-axial direction), and has a cylindrical shape having the same center as the central axis J. That is, in the present embodiment, the pin guide member 33 extends in the axial direction. The pin 70 is inserted inside the pin guide member 33. The pin guide member 33 movably holds the pin 70. In the present embodiment, since the pin guide member 33 extends in the axial direction, the pin 70 moves in the axial direction.

[Pin]

The pin 70 is located at the hole portion 41e. The pin 70 is held by the pin guide member 33 to be movable in the axial direction (the Z-axial direction). The pin 70 has, for instance, a columnar shape extending in the axial direction (the Z-axial direction). A lower end of the pin 70 is provided with a small diameter portion whose diameter is reduced. An upper end of the pin 70 can come into contact with a lower end of the movable element 50. The lower end of the pin 70 can come into contact with the valve body 64.

[Valve Section]

The valve section 60 is provided outside the cover 40. The valve section 60 is attached at a lower side (a −Z side) of the cover 40. The valve section 60 has a first nozzle member 61, a second nozzle member 62, a valve chamber member 63, and a valve body 64. The valve chamber member 63 has a valve chamber 65 therein. The valve body 64 is housed in the valve chamber 65. The valve body 64 is, for instance, a spherical body.

The first nozzle member 61 is attached at a lower side (a −Z side) of the valve chamber member 63. The first nozzle member 61 is provided with an inner port 61a that passes therethrough in the axial direction. The inner port 61a is an inflow port of a fluid. A lower end of the inner port 61a is, for instance, connected to a pump (not shown). An upper end of the inner port 61a can communicate with the valve chamber 65 of the valve chamber member 63.

The second nozzle member 62 is fixed to the lower surface of the lower plate 41 of the cover 40. The second nozzle member 62 is provided with outer ports 62a and 62b and a drain port 62c. The outer ports 62a and 62b are outflow ports of the fluid. The outer ports 62a and 62b are, for instance, open at the lower side (the −Z side). The outer port 62a communicates with the valve chamber 65 of the valve chamber member 63. The drain port 62c passes through, for instance, the second nozzle member 62 in the radial direction (the Y-axial direction). The drain port 62c can communicate with the valve chamber 65. The drain port 62c is open to the atmosphere. The pin 70 passes through the drain port 62c in the axial direction (the Z-axial direction).

The second nozzle member 62 is provided with a fitting hole portion 62d that penetrates from an upper surface thereof to the drain port 62c in the axial direction (Z-axial direction). The pin guide member 33 is fitted into the fitting hole portion 62d.

The valve chamber member 63 is attached to the second nozzle member 62. The valve chamber member 63 is located between the first nozzle member 61 and the second nozzle member 62 in the axial direction (the Z-axial direction). The valve chamber member 63 is provided with outer port-communicating hole portions 63a and 63b, an inner port-communicating hole portion 63c, and a drain port-communicating hole portion 63d. A tip of the pin 70 extends to the drain port-communicating hole portion 63d.

The outer port-communicating hole portions 63a and 63b connect the valve chamber 65 and the outer ports 62a and 62b. The inner port-communicating hole portion 63c can connect the valve chamber 65 and the inner port 61a. An upper end of the inner port-communicating hole portion 63c is provided with a lower valve seat portion 63e. The drain port-communicating hole portion 63d can connect the valve chamber 65 and the drain port 62c. A lower end of the drain port-communicating hole portion 63d is provided with an upper valve seat portion 63f.

[Movable Element]

The movable element 50 is located above the pin 70. In the present embodiment, the movable element 50 has, for instance, a columnar shape. The movable element 50 moves in the axial direction (the Z-axial direction). The movable element 50 has a connecting member 53, a permanent magnet 54, and a pair of yokes (a first yoke 51 and a second yoke 52).

The connecting member 53 connects the permanent magnet 54, the first yoke 51, and the second yoke 52. In the present embodiment, the connecting member 53 has a tubular shape extending in the axial direction (the Z-axial direction). The connecting member 53 is made of a non-magnetic material.

The permanent magnet 54 has, for instance, an annular shape. The permanent magnet 54 is fixed to an outer surface 53a of the outside of the connecting member 53 in the radial direction. The permanent magnet 54 is fixed, for instance, by being fit into the outside of the connecting member 53 in the radial direction. The permanent magnet 54 has different magnetic poles (N and S poles) in the axial direction (the Z-axial direction).

The first yoke 51 is located at a lower side (a −Z side) of the permanent magnet 54. The second yoke 52 is located at an upper side (a +Z side) of the permanent magnet 54. That is, the pair of yokes 51 and 52 are disposed at opposite sides of the permanent magnet 54 in the axial direction (the Z-axial direction). Each of the first yoke 51 and the second yoke 52 is in contact with the permanent magnet 54. In the present embodiment, the first yoke 51 and the second yoke 52 are separate members.

The first yoke 51 has a first recess 51a recessed toward the lower side (the −Z side) in an upper surface thereof. The second yoke 52 has a second recess 52a recessed toward the upper side (the +Z side) in a lower surface thereof. An inner surface of the first recess 51a and an inner surface of the second recess 52a are fixed to the outer surface 53a of the outside of the connecting member 53 in the radial direction. In the present embodiment, a lower end of the connecting member 53 is fitted into the first recess 51a. In the present embodiment, an upper end of the connecting member 53 is fitted into the second recess 52a.

The movable element 50 is provided with a through-hole 50a that passes through the movable element 50 in the axial direction (the Z-axial direction). That is, the through-hole 50a passes through the permanent magnet 54 and the yokes 51 and 52 in the axial direction. The through-hole 50a extends, for instance, in a linear shape. A cross-sectional shape of the through-hole 50a has, for instance, a circular shape having the same center as the central axis J. The through-hole 50a is made up of a hole portion provided for the first yoke 51, an inner portion of the connecting member 53, and a hole portion provided for the second yoke 52.

[Solenoid]

Next, the solenoid 20 of the present embodiment will be described.

Figure 3:
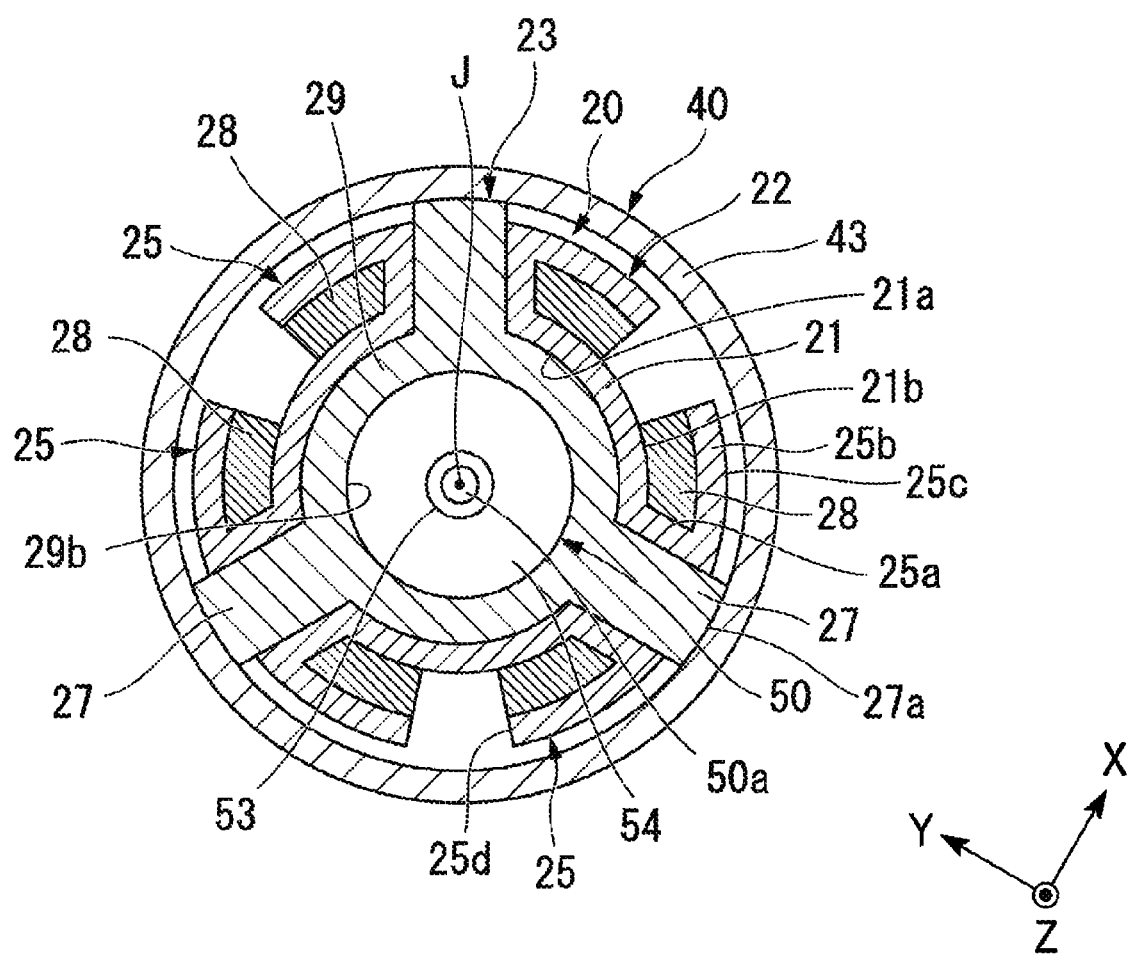
FIG. 3 is a cross-sectional view illustrating the electromagnetic valve of the first embodiment and taken along line of FIG. 1.
Figure 4:
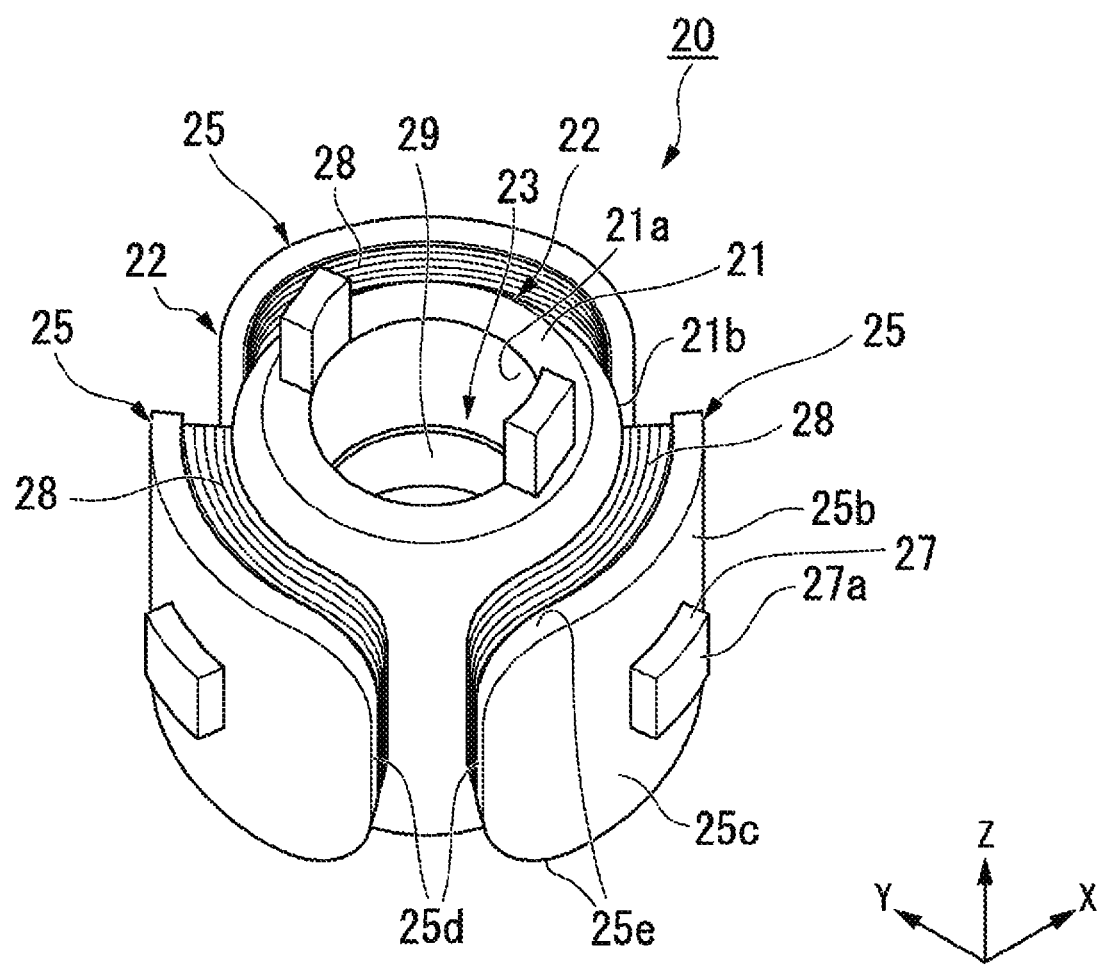
FIG. 4 is a perspective view illustrating a solenoid of the first embodiment.

FIG. 3 is a cross-sectional view taken along line of FIG. 1. FIG. 4 is a perspective view of the solenoid 20 of the present embodiment. In FIG. 4, a guide bush 30 is omitted.

As illustrated in FIG. 3, the solenoid 20 has an insulator 22, a core 23, a plurality of (three) coils 28, and a guide bush (a guide part) 30 (see FIGS. 1 and 2). As illustrated in FIGS. 1 and 2, the solenoid 20 is located inside the tubular part 43 in the radial direction.

As illustrated in FIGS. 1 and 2, the guide bush 30 has a tubular shape having the same center as the central axis J extending in the axial direction (the Z-axial direction). The guide bush 30 has, for instance, a cylindrical shape. The movable element 50 is located inside the guide bush 30 in the radial direction. The guide bush 30 is made of a non-magnetic material. In the present embodiment, the guide bush 30 includes a lower guide bush 31 and an upper guide bush 32. The lower guide bush 31 and the upper guide bush 32 are fitted inside the tubular insulator 22. The movable element 50 is located inside the guide bush 30 in the radial direction.

As illustrated in FIG. 3, the core 23 is located outside the movable element 50 in the radial direction. In the present embodiment, the core 23 has a ring part 29 and a plurality of (three) tooth parts 27. The ring part 29 and the tooth parts 27 are made of a magnetic material.

The ring part 29 has an annular shape having the same center as the central axis J. The ring part 29 is located inside the insulator 22. The ring part 29 has an annular shape surrounding the outside of the movable element 50 in the radial direction. A ring part inner surface 29b of the ring part 29 faces the movable element 50.

The tooth parts 27 protrude outward from the ring part 29 in the radial direction. That is, inner ends of the tooth parts 27 in the radial direction are connected in the circumferential direction by the ring part 29. In the present embodiment, the core 23 has the three tooth parts 27. The coils 28 are wound around the tooth parts 27 via bobbin parts 25 of the insulator 22.

The tooth parts 27 have approximately quadrangular prism shapes. However, the shapes of the tooth parts 27 are not particularly restricted, and may be columnar shapes, polygonal shapes, or other shapes.

Outer ends 27a of the tooth parts 27 in the radial direction protrude to the outsides of the bobbin parts 25 of the insulator 22 in the radial direction. The outer ends of the tooth parts 27 in the radial direction are in contact with and fixed to a tubular part inner surface (an inner surface) 43a that is an inner surface of the tubular part 43 of the cover 40 in the radial direction. Thus, a magnetic circuit ranging from the tooth parts 27 to the cover 40 can be formed, and diffusion of a magnetic field can be suppressed to increase an attractive force of the solenoid.

In the present embodiment, three or more tooth parts 27 are provided. The tooth parts 27 are provided at regular intervals in the circumferential direction. For this reason, the core 23 can be stably fixed with respect to the cover 40.

In the present embodiment, the ring part 29 and the tooth parts 27 are formed of a single member. As a method of manufacturing the core 23, a method of punching a plate-like magnetic material member using a press may be adopted.

When the core 23 does not have the ring part 29, the plurality of tooth parts 27 are provided as separate members. For this reason, it is difficult to accurately position a relative position between the tooth parts 27. If the relative position between the tooth parts 27 deviates, the magnetic force applied to the movable element 50 is not made uniform in the circumferential direction. In contrast, according to the present embodiment, the core 23 has the ring part 29 connecting the plurality of tooth parts 27. Thereby, it is easy to accurately position the relative position between the tooth parts 27. As a result, the magnetic force applied to the movable element 50 by the core 23 can be easily made uniform in the circumferential direction, and rectlinearity of the movable element 50 can be improved. By improving the rectlinearity of the movable element 50, an endurance limit of the guide bush 30 that supports the movable element 50 to be movable linearly can be increased.

The insulator 22 has a cylindrical part 21 and a plurality of (three) bobbin parts 25. That is, the solenoid 20 has the cylindrical part 21 and the bobbin parts 25. The insulator 22 is made of, for instance, a resin. The insulator 22 is insert-molded with the core 23 contained therein. The insulator 22 supports the core 23.

The cylindrical part 21 has a cylindrical shape surrounding the outside of the movable element 50 in the radial direction. As illustrated in FIGS. 1 and 2, an inner circumferential surface 21a of the cylindrical part 21 is provided with a pair of guide bushes 31 and 32. The ring part 29 of the core 23 is exposed from the inner circumferential surface 21a of the cylindrical part 21. Of the guide bushes 31 and 32, the lower guide bush 31 is located at a lower side of the exposed ring part 29, and the upper guide bush 32 is located at an upper side of the ring part 29. The plurality of tooth parts 27 extend outward from the cylindrical part 21 in the radial direction.

The bobbin parts 25 are provided for the plurality of (three) tooth parts 27. Each of the bobbin parts 25 has a tooth envelopment part 25a and a flange part 25b.

The flange part 25b is a plate-like member that is located outside the cylindrical part 21 in the radial direction and is bent in an arcuate shape when viewed in the axial direction. The flange part 25b is bent along an outer circumferential surface 21b of the cylindrical part 21 and extends in the circumferential direction. A gap having a constant distance in the radial direction is provided between the flange part 25b and the outer circumferential surface 21b. The flange part 25b runs along the tubular part inner surface 43a of the cover 40. A gap having a constant distance in the radial direction is provided between the flange part 25b and the tubular part inner surface 43a.

The tooth part 27 passes through the flange part 25b. The outer end 27a of the tooth part 27 in the radial direction is exposed from an outer surface 25c of the flange part 25b. Thereby, the flange part 25b does not hinder the end 27a of the tooth parts 27 from coming into contact with the cover 40.

As illustrated in FIG. 4, the flange part 25b has a pair of circumferential end faces 25d and a pair of axial end faces 25e. The circumferential end faces 25d are surfaces facing the neighboring flange part 25b. The axial end faces 25e are surfaces directed in the axial direction. The circumferential end face 25d and the axial end face 25e are continuous with a round smooth curved surface. That is, the flange part 25b has a shape rounded with no angle when viewed in a direction in which the tooth parts 27 extend. Thereby, when winding work for winding coils 28 between the flange parts 25b and the cylindrical part 21 is performed, a coil wire is hardly caught between the circumferential end faces 25d and the axial end faces 25e. Therefore, ease of the winding work can be improved.

The tooth envelopment part 25a is located between the outer circumferential surface 21b of the cylindrical part 21 and the flange part 25b, and covers an axial end face and a circumferential end face of each of the tooth parts 27. The tooth envelopment part 25a prevents the tooth part 27 and the coil 28 from coming in contact with each other and maintains insulation. The tooth envelopment part 25a may not completely envelope the tooth part 27 if it prevents the contact of the tooth part 27 and the coil 28.

As illustrated in FIGS. 1 and 2, the coils 28 are wound around the bobbin parts 25 provided for the tooth parts 27. The coils 28 magnetize the tooth parts 27 of the core 23. Each of the coils 28 is located between the cylindrical part 21 and the flange part 25b. The coils 28 are wound along the cylindrical part 21 of the insulator 22.

The plurality of coils 28 are disposed along the outer circumferential surface 21b of the cylindrical part 21 at regular intervals in the circumferential direction. In the present embodiment, the three or more coils 28 are provided for the solenoid 20. For this reason, the magnetic force applied to the movable element 50 is easily made uniform in the circumferential direction by the magnetic circuit passing through the tooth parts 27. Thereby, the rectlinearity of the movable element 50 can be improved, and efficiency of the electromagnetic valve 1 can be improved. In addition, by improving the rectlinearity of the movable element 50, the endurance limit of the guide bush 30 that supports the movable element 50 to be movable linearly can be increased.

In the solenoid 20 of the present embodiment, the flange part 25b may be used as a separate member independent of the insulator 22. In this case, the coils 28 that are multiply wound in advance and are hardened with an adhesive or the like can be inserted into the tooth parts 27 and be mounted on the tooth parts 27. Further, the bobbin parts 25 can be formed by attaching the flange parts 25b to the tooth parts 27 around which the coils 28 are mounted.

The electromagnetic valve 1 of the present embodiment has a shape disposed to be concentric with the movable element 50, the inner and outer circumferential surfaces 21a and 21b of the cylindrical part 21, the flange parts 25b, and the tubular part 43 of the cover 40 when viewed in the axial direction.

The movable element 50 and the inner circumferential surface 21a of the cylindrical part 21 are disposed in a concentric shape, and thereby the movable element 50 can move along the inner circumferential surface 21a, and smooth motion of the movable element 50 is possible.

The movable element 50, the outer circumferential surface 21b of the cylindrical part 21, and the flange parts 25b are disposed in the concentric shape, and thereby the coils 28 interposed between the outer circumferential surface 21b and the flange parts 25b can be disposed in an arcuate shape to surround the movable element 50. Thus, a uniform magnetic field is generated in the circumferential direction of the movable element 50 by the coils 28, so that the rectlinearity of the motion of the movable element 50 can be improved.

The flange part 25b and the tubular part 43 of the cover 40 are disposed in the concentric shape, and thereby an interval between the flange part 25b and the tubular part 43 in the radial direction can be reduced. Thus, a dimension of the electromagnetic valve 1 in the radial direction can be reduced, and the miniaturized electromagnetic valve 1 can be formed.

Hereinafter, an operation of the electromagnetic valve 1 of the present embodiment will be described. First, magnetic circuits generated at the electromagnetic valve 1 will be described.

For example, when one magnetic pole disposed at the upper side (the +Z side) is set to an N pole and the other magnetic pole disposed at the lower side (the −Z side) is set to an S pole among the magnetic poles of the permanent magnet 54, magnetic flux of the permanent magnet 54 is discharged from the upper surface of the permanent magnet 54 into the second yoke 52. The magnetic flux discharged into the second yoke 52 returns back to the permanent magnet 54 from the lower surface sequentially via the upper plate 42, the tubular part 43, the lower plate 41, and the first yoke 51.

Thereby, a magnetic circuit is formed, and the first yoke 51, the second yoke 52, and the cover 40 formed of a magnetic material are magnetized. A mutually attractive magnetic force is generated between the magnetized first yoke 51 and the lower plate 41. A mutually attractive magnetic force is generated between the magnetized second yoke 52 and the upper plate 42.

In addition to the magnetic circuit, in the state shown in FIG. 1, a magnetic circuit in which the magnetic flux discharged into the second yoke 52 returns back to the permanent magnet 54 sequentially via the upper plate 42, the tubular part 43, and the core 23 is formed. For this reason, in the state shown in FIG. 1, the magnetic force between the second yoke 52 and the upper plate 42 is greater than the magnetic force between the first yoke 51 and the lower plate 41. Thereby, even in a state in which no current is supplied to the coils 28, the valve section 60 can maintain the state of FIG. 1, i.e. the opened state.

On the other hand, in the state shown in FIG. 2, a magnetic circuit in which the magnetic flux discharged into the second yoke 52 returns back to the permanent magnet 54 sequentially via the core 23, the tubular part 43, the lower plate 41, and the first yoke 51 is formed. For this reason, in the state shown in FIG. 2, the magnetic force between the first yoke 51 and the lower plate 41 is greater than the magnetic force between the second yoke 52 and the upper plate 42. Thereby, even in the state in which no current is supplied to the coils 28, the valve section 60 can maintain the state of FIG. 2, i.e. the closed state.

For this reason, according to the present embodiment, because it is not necessary to supply current to the coils 28 to maintain the valve section 60 in the opened state and the closed state, power consumption of the electromagnetic valve 10 can be reduced.

Next, an opening/closing operation of the valve section 60 in the present embodiment will be described. In the state in which the valve section 60 illustrated in FIG. 1 is opened, an upper surface of the movable element 50, i.e. an upper surface of the second yoke 52, is in contact with the upper plate 42. A lower surface of the first yoke 51 and an upper surface of the pin 70 are separated in the axial direction (the Z-axial direction).

In the state in which the valve section 60 is opened, the valve body 64 and the pin 70 are maintained to be pushed upward toward the upper side (the +Z side) by a pressure of a fluid flowing into the inner port 61a. Thereby, the inner port 61a and the outer ports 62a and 62b communicate with each other via the inner port-communicating hole portion 63c, the valve chamber 65, and the outer port-communicating hole portions 63a and 63b. Therefore, a fluid flowing from the inner port 61a into the valve section 60 flows from the outer ports 62a and 62b to the outside of the valve section 60. The valve body 64 pushed upward by the fluid flowing into the inner port 61a is fitted onto the upper valve seat portion 63f and blocks the drain port-communicating hole portion 63d.

In the state in which the valve section 60 is opened, when a current flows to the coils 28, magnetic flux is generated from the coils 28. The magnetic flux generated from the coils 28 is, for instance, directed from the inside to the outside of the coils 28 in the radial direction. That is, the magnetic flux generated from the coils 28 moves, for instance, in the tooth parts 27 from the inside to the outside in the radial direction. The magnetic flux moving in the tooth parts 27 is divided and moves to the upper side (the +Z side) and the lower side (the −Z side) of the tubular part 43 from portions where the tooth parts 27 and the tubular part 43 are in contact with each other. The magnetic flux moving upward along the tubular part 43 returns back to the tooth parts 27 via the upper plate 42 and the second yoke 52. The magnetic flux moving downward along the tubular part 43 returns back to the tooth parts 27 via the lower plate 41 and the first yoke 51. In this way, the current flows to the coils 28, and thereby a magnetic circuit of the coils 28 is formed.

In the magnetic circuit of the coils 28, the magnetic flux flows from the upper side (the +Z side) toward the lower side (the −Z side) at the upper plate 42 and the second yoke 52. That is, the flow of the magnetic flux in the upper plate 42 and the second yoke 52 due to the magnetic circuit of the coils 28 has a reversed direction with respect to the flow of the magnetic flux in the upper plate 42 and the second yoke 52 due to the aforementioned magnetic circuit of the permanent magnet 54. For this reason, the magnetic flux caused by the magnetic circuit of the coils 28 and the magnetic flux caused by the magnetic circuit of the permanent magnet 54 are mutually weakened in the upper plate 42 and the second yoke 52. Thereby, the magnetic force between the second yoke 52 and the upper plate 42 is reduced.

On the other hand, in the magnetic circuit of the coils 28, the magnetic flux flows from the lower side (the −Z side) toward the upper side (the +Z side) at the lower plate 41 and the first yoke 51. That is, the flow of the magnetic flux in the lower plate 41 and the first yoke 51 due to the magnetic circuit of the coils 28 has the same direction as the flow of the magnetic flux in the lower plate 41 and the first yoke 51 due to the aforementioned magnetic circuit of the permanent magnet 54. For this reason, the magnetic flux caused by the magnetic circuit of the coils 28 and the magnetic flux caused by the magnetic circuit of the permanent magnet 54 are mutually strengthened in the lower plate 41 and the first yoke 51. Thereby, the magnetic force between the first yoke 51 and the lower plate 41 is increased.

As a result, the magnetic force between the second yoke 52 and the upper plate 42 is weaker than the magnetic force between the first yoke 51 and the lower plate 41. Therefore, the movable element 50 is attracted toward the lower plate 41, and moves to the lower side (the −Z side) in the guide bush 30. If the movable element 50 moves to the lower side, the lower surface of the movable element 50 comes into contact with the upper end of the pin 70. Thereby, the movable element 50 moves to the lower side, and the pin 70 is pushed down to the lower side.

As illustrated in FIG. 2, if the pin 70 is pushed down to the lower side (the −Z side), the lower end of the pin 70 pushes the valve body 64 down to the lower side. Thereby, the valve body 64 is fitted onto the lower valve seat portion 63e, and blocks the inner port-communicating hole portion 63c. As a result, a flow of the fluid between the inner port 61a and the outer ports 62a and 62b is obstructed, and the valve section 60 is in the closed state.

In the state in which the valve section 60 is closed, the drain port-communicating hole portion 63d is opened. For this reason, the outer ports 62a and 62b and the drain port 62c communicate with each other. A fluid left behind in the outer ports 62a and 62b at a high pressure flows to the drain port 62c. Since the drain port 62c is open to the atmosphere, a pressure of the fluid flowing into the drain port 62c is reduced.

In this way, the valve section 60 can be changed from the opened state to the closed state. Here, after the valve section 60 is transitioned to the closed state show in FIG. 2, even if current supplied to the coils 28 is stopped as described above, the state of the valve section 60 is maintained in the state of FIG. 2. In this case, the magnetic force between the first yoke 51 and the lower plate 41 is greater than a force obtained by the sum of the magnetic force between the second yoke 52 and the upper plate 42 and a push-up force of the fluid which is transmitted to the movable element 50 via the valve body 64 and pin 70.

A direction of the current supplied to the coils 28 when the valve section 60 is changed from the closed state to the opened state is reversed with respect to that when the valve section 60 is changed from the opened state to the closed state. Thereby, since the magnetic circuit of the coils 28 is formed in the reverse direction compared to when the valve section 60 is changed from the opened state to the closed state, the magnetic flux in the first yoke 51 and the lower plate 41 is weakened, and the magnetic flux in the second yoke 52 and the upper plate 42 is strengthened. As a result, the magnetic force between the second yoke 52 and the upper plate 42 is greater than the magnetic force between the first yoke 51 and the lower plate 41, and the movable element 50 is attracted to the upper plate 42.

When the movable element 50 moves to the upper side (the +Z side), the valve body 64 and the pin 70 are pushed upward by the pressure of the fluid flowing into the inner port 61a. Thereby, the inner port 61a and the outer ports 62a and 62b communicate with each other via the inner port-communicating hole portion 63c, the valve chamber 65, and the outer port-communicating hole portions 63a and 63b, and the valve section 60 is opened again. After the valve section 60 is transitioned to the opened state shown in FIG. 1, even if current supplied to the coils 28 is stopped as described above, the state of the valve section 60 is maintained in the state of FIG. 1.

As described above, the pin 70 moves along with the movement of the movable element 50, and the valve section 60 is opened or closed. That is, the valve section 60 is opened or closed along with the movement of the movable element 50 and the pin 70.

According to the present embodiment, the movable element 50 housed in the cover 40 made of a magnetic material has the permanent magnet 54, and the pair of yokes 51 and 52 located at the opposite sides of the permanent magnet 54 in the axial direction. The permanent magnet 54 has the two magnetic poles disposed in the axial direction. For this reason, in the way described above, the movable element 50 can be displaced in the axial direction by the magnetic circuit based on the permanent magnet 54 and the magnetic circuit based on the coils 28. In addition, since the magnetic circuit is formed differently according to whether the valve section 60 is in the opened state or the closed state, even if current is not supplied to the coils 28, the self-holding electromagnetic valve 1 in which the valve section 60 is maintained in the opened or closed state can be provided.

Therefore, according to the present embodiment, the movable element 50 can be displaced without using the coil spring, and the valve section 60 can be maintained in the opened or closed state even in the state in which the current carried to the coils 28 is obstructed. Therefore, there is no concern of a valve-holding force of the electromagnetic valve 1 being made unstable due to jamming or stranding of the coil spring. That is, the electromagnetic valve 1 can stably perform the opening/closing of the valve. Moreover, the coil spring is not used, and thereby the number of parts is reduced, and the cost-saving electromagnetic valve 1 can be provided.

In addition, in the electromagnetic valve 1 of the present embodiment, the entire electromagnetic valve 1 can be miniaturized as a coil spring is not provided. Further, the coil spring is not provided, and thereby the magnetic force applied to the movable element 50 can be reduced by the permanent magnet 54. Thereby, the permanent magnet 54 can be miniaturized and, as a result, the entire electromagnetic valve 1 can be further miniaturized. In this way, according to the present embodiment, the electromagnetic valve 1 having a structure that can be miniaturized can be obtained.

In the solenoid 20 of the present embodiment, when viewed in the axial direction, the outer circumferential surface 21b of the cylindrical part 21 is in a circular shape, and the flange part 25b is bent along the outer circumferential surface 21b in an arcuate shape. Thus, the gap between the flange part 25b and the tubular part 43 of the cover 40 can be reduced. By reducing the gap, the electromagnetic valve 1 in which an internal space of the cover 40 is effectively used and which is reduced in size in the radial direction can be provided.

OTHER EMBODIMENTS

Next, a solenoid 120 of a comparative example which can be adopted for the electromagnetic valve 1 of the aforementioned embodiment, and a solenoid 220 of a second embodiment will be described.

Figure 6:
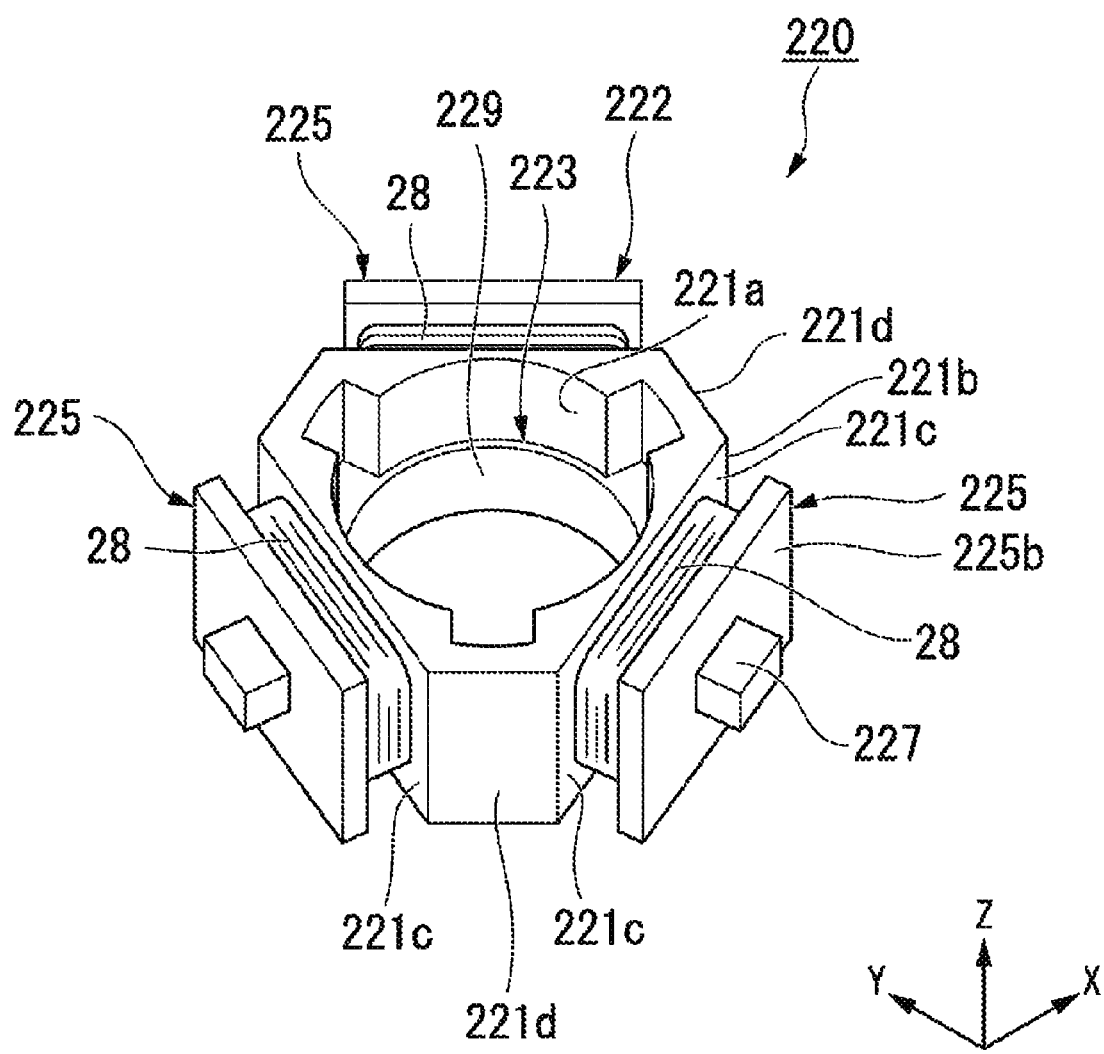
FIG. 6 is a perspective view illustrating the solenoid of the second embodiment.
Figure 7:
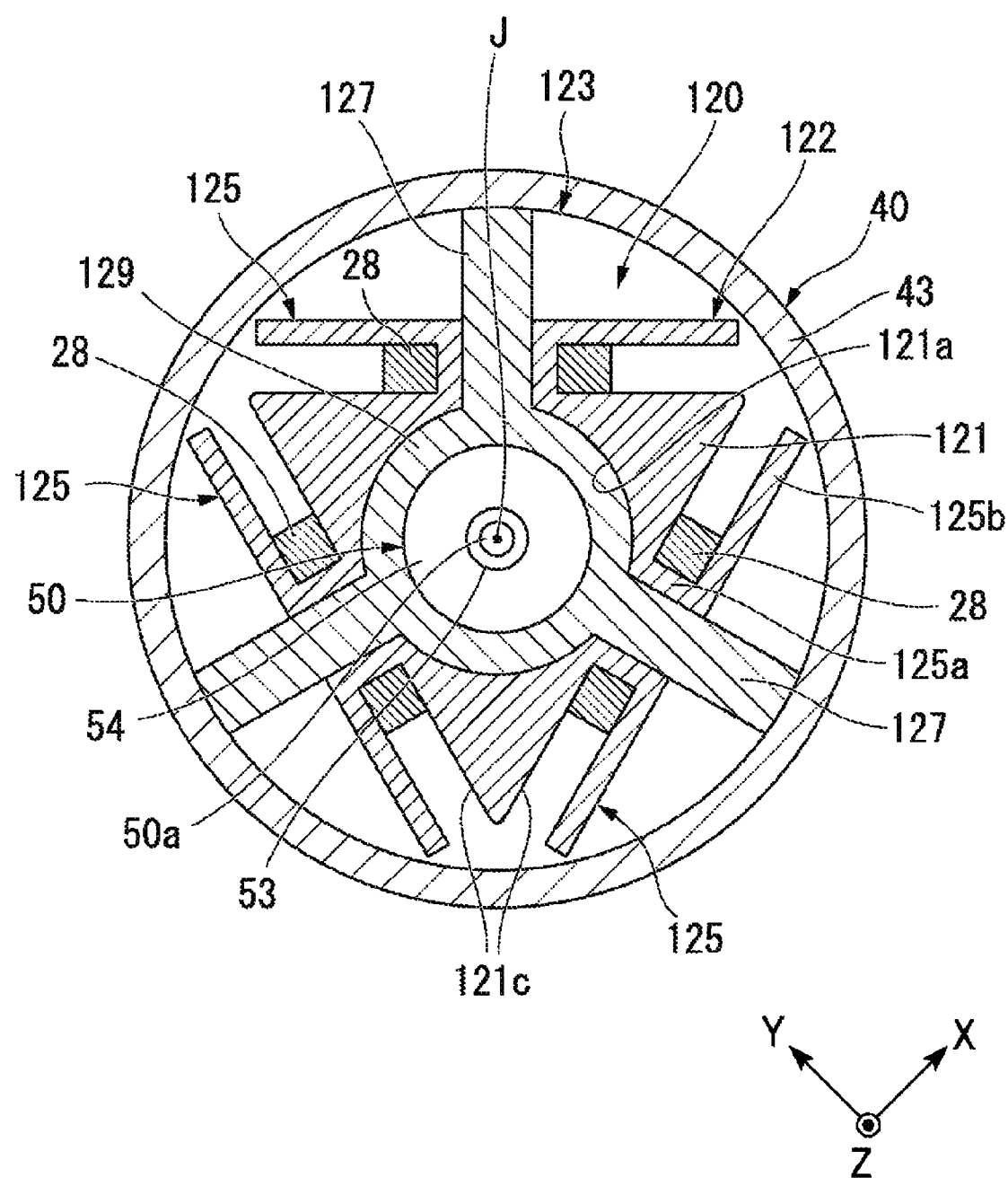
FIG. 7 is a cross-sectional view illustrating an electromagnetic valve for which a solenoid of a comparative example is adopted.
Figure 8:
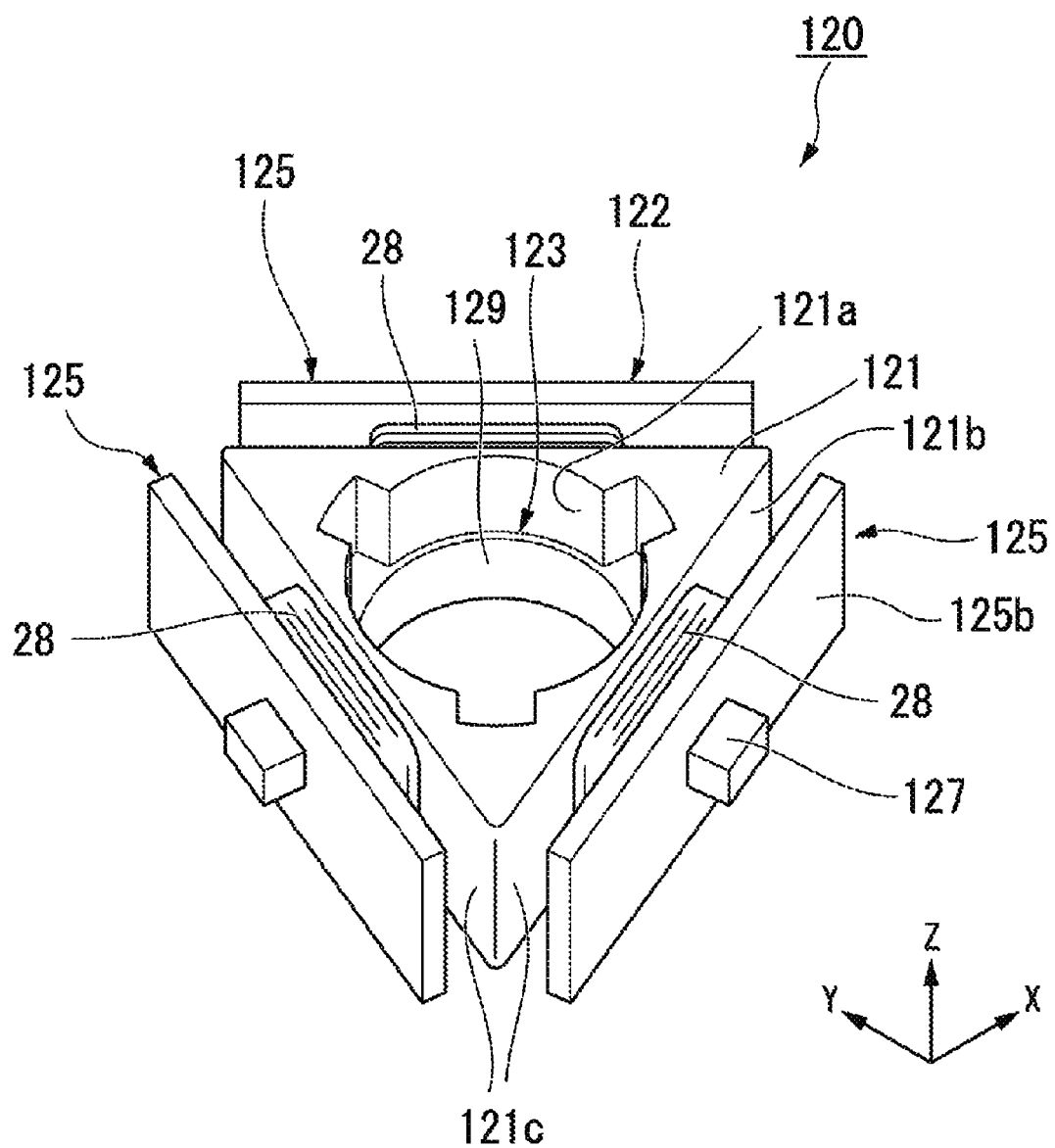
FIG. 8 is a perspective view illustrating the solenoid of the comparative example.

The inventors developed the solenoid 120 of the comparative example illustrated in FIGS. 7 and 8 as the solenoid adopted for the electromagnetic valve 1 of the present embodiment. Afterwards, the inventors earnestly studied the solenoid 120, and developed the solenoid 220 of the second embodiment illustrated in FIGS. 5 and 6. The inventors targeted higher performance, and developed the solenoid 20 of the aforementioned first embodiment illustrated in FIGS. 3 and 4.

The cross-sectional view of the electromagnetic valve 1 illustrated in FIGS. 1 and 2 is approximately the same even in the case in which the solenoids 120 and 220 are adopted.

Comparative Example

The solenoid 120 of the comparative example will be described.

FIG. 7 is a cross-sectional view of the electromagnetic valve 1 in the case in which the solenoid 120 is adopted, and corresponds to FIG. 3 of the aforementioned embodiment. FIG. 8 is a perspective view of the solenoid 120. In FIG. 4, the guide bush 30 is omitted. The solenoid 120 is mainly different in a shape of an insulator 122, compared to the aforementioned solenoid 20.

The solenoid 120 has an insulator 122, a core 123, a plurality of (three) coils 28, and a guide bush (a guide part) 30 (see FIG. 1).

A core 123 has the same structure of the core 23 of the aforementioned embodiment, and has a ring part 129 and a plurality of (three) tooth parts 127. The ring part 129 and the tooth parts 127 are made of a magnetic material. Coils 28 are wound around the tooth parts 127 via bobbin parts 125 of the insulator 122.

The insulator 122 has a tubular part 121 and a plurality of bobbin parts 125. That is, the solenoid 120 has the tubular part 121 and the bobbin parts 125. The tubular part 121 is a part corresponding to the cylindrical part 21 in the aforementioned solenoid 20.

The tubular part 121 has a tubular shape surrounding the outside of the movable element 50 in the radial direction. The tubular part 121 has an inner circumferential surface 121a and an outer circumferential surface 121b. The inner circumferential surface 121a of the tubular part 121 has a circular shape when viewed in the axial direction. The inner circumferential surface 121a of the tubular part 121 is provided with a pair of guide bushes 31 and 32. The outer circumferential surface 121b of the tubular part 121 has the shape of a regular triangle when viewed in the axial direction. The outer circumferential surface 121b includes a plurality of (three) lateral surfaces 121c constituting sides of the regular polygon (the regular triangle). The tooth parts 127 extend outward from the respective three lateral surfaces 121c in the radial direction.

The bobbin parts 125 are provided for the plurality of (three) tooth parts 127. Each of the bobbin parts 125 has a tooth envelopment part 125a and a flange part 125b.

The flange parts 125b are provided along the lateral surfaces 121c with a gap of a constant distance from the lateral surfaces 121c of the tubular part 121. The flange part 125b has a flat plate shape extending in parallel with the lateral surface 121c.

The tooth envelopment parts 125a are each located between the outer circumferential surface 121b of the tubular part 121 and the flange part 125b, and cover axial and circumferential end faces of the tooth parts 127.

Even in the case in which the electromagnetic valve 1 of the embodiment adopts the solenoid 120 of the comparative example, like the case in which the electromagnetic valve 1 adopts the solenoid 20 of the aforementioned embodiment, the movable element 50 can be operated without using the coil spring.

However, as illustrated in FIG. 7, the solenoid 120 of the comparative example has a problem in that the tubular part 43 of the cover 40 for housing the flange parts 125b is enlarged and a dimension of the electromagnetic valve 1 in the radial direction is increased. Thus, the inventors developed the solenoid 220 of the second embodiment by improving the solenoid 120 of the comparative example.

Second Embodiment

The solenoid 220 of the second embodiment will be described.

Figure 5:
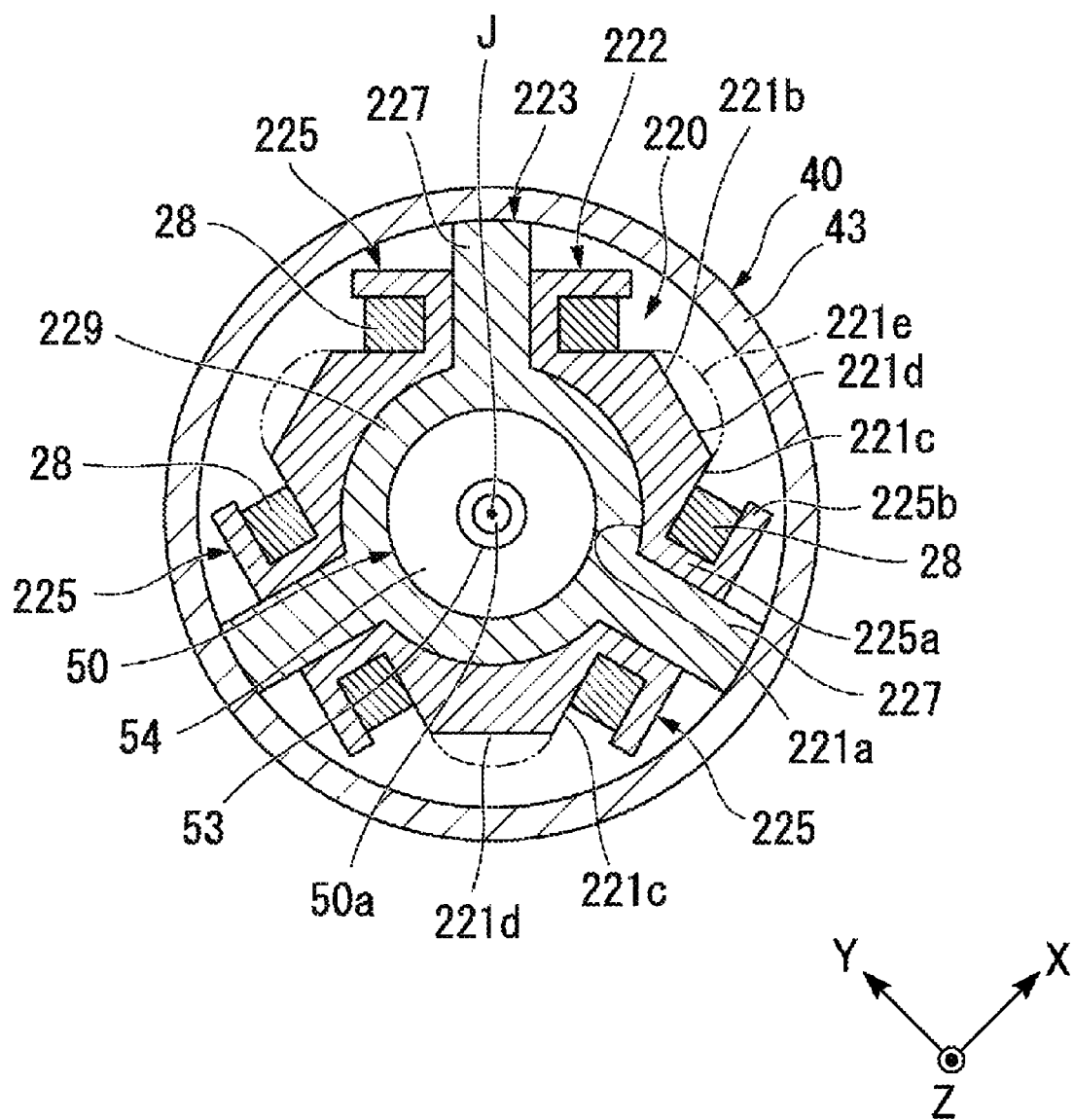
FIG. 5 is a cross-sectional view illustrating an electromagnetic valve for which a solenoid of a second embodiment is adopted.

FIG. 5 is a cross-sectional view of the electromagnetic valve 1 when the solenoid 220 is adopted, and corresponds to FIG. 3 of the aforementioned embodiment. FIG. 6 is a perspective view of the solenoid 220. In FIG. 4, the guide bush 30 is omitted. The solenoid 220 is mainly different in a shape of an insulator 222, compared to the aforementioned solenoid 20 and the solenoid 120 of the comparative example.

The solenoid 220 has an insulator 222, a core 223, a plurality of (three) coils 28, and a guide bush (a guide part) 30 (see FIG. 1).

The core 223 has the same structure as the core 23 of the aforementioned embodiment, and has a ring part 229 and a plurality of (three) tooth parts 227. The ring part 229 and the tooth parts 227 are made of a magnetic material. Coils 28 are wound around the tooth parts 227 via bobbin parts 225 of the insulator 222.

The insulator 222 has a tubular part 221 and a plurality of bobbin parts 225. That is, the solenoid 220 has the tubular part 221 and the bobbin parts 225. The tubular part 221 is a part corresponding to the cylindrical part 21 in the aforementioned solenoid 20.

The tubular part 221 has a tubular shape surrounding the outside of the movable element 50 in the radial direction. The tubular part 221 has an inner circumferential surface 221a and an outer circumferential surface 221b. The inner circumferential surface 221a of the tubular part 221 has a circular shape when viewed in the axial direction. The inner circumferential surface 221a of the tubular part 221 is provided with a pair of guide bushes 31 and 32. The outer circumferential surface 221b of the tubular part 221 has a hexagonal shape when viewed in the axial direction. The outer circumferential surface 221b includes three first lateral surfaces 221c, and second lateral surfaces 221d located between the first lateral surfaces 221c in the circumferential direction. The first lateral surfaces 221c and the second lateral surfaces 221d are alternately arranged in the circumferential direction.

In the present embodiment, an angle formed mutually by the neighboring first lateral surfaces 221c when viewed in the axial direction is 60°. The angle formed by the neighboring first lateral surfaces 221c is equal to an internal angle of a regular polygon (a regular n angle) corresponding to the number of (n) tooth parts 227.

The first lateral surfaces 221c are orthogonal to directions in which the tooth parts 227 extend. The tooth parts 227 extend from the three first lateral surfaces 221c toward the outside in the radial direction.

The second lateral surfaces 221d are surfaces obtained by chamfering the angles formed between the first lateral surfaces 221c. The second lateral surfaces 221d reduce the maximum diameter of the tubular part 221. The second lateral surfaces 221d of the present embodiment are flat surfaces. The second lateral surfaces 221d may be curved surfaces.

In FIG. 5, curved lateral surfaces (second lateral surfaces) 221e when curved surfaces are adopted are expressed by a dashed-two dotted line as the second lateral surfaces. The curved lateral surfaces 221e smoothly connect the neighboring first lateral surfaces 221c. That is, the neighboring first lateral surfaces 221c are smoothly continuous via the curved lateral surfaces 221e. Even when the curved lateral surfaces 221e are adopted as the second lateral surfaces, the maximum diameter of the tubular part 221 can be reduced.

The bobbin parts 225 are provided for the plurality of (three) tooth parts 227. Each of the bobbin parts 225 has a tooth envelopment part 225a and a flange part 225b. The coils 28 are wound around the bobbin parts 225.

The flange parts 225b are provided along the first lateral surfaces 221c with a gap of a constant distance from the first lateral surfaces 221c. The flange part 225b has a flat plate shape extending in parallel with the first lateral surface 221c. The flange part 225b may have a shape rounded with no angle when viewed in a direction in which the tooth part 227 extends.

The tooth envelopment parts 225a are each located between the outer circumferential surface 221b of the tubular part 221 and the flange part 225b, and cover axial and circumferential end faces of the tooth parts 227.

Even in the case in which the solenoid 220 of the second embodiment is adopted, the electromagnetic valve 1 can exert the same effects as the case in which the solenoid 20 of the embodiment is adopted. That is, the self-holding electromagnetic valve 1 in which the movable element 50 can be displaced without using the coil spring and the opened/closed state of the valve section 60 is maintained even in the state in which the current carried to the coils 28 is obstructed can be provided.

In comparison with the solenoid 120 of the comparative example, the solenoid 220 of the second embodiment can reduce the maximum dimension in the radial direction. Thereby, it is possible to reduce a gap between the solenoid 220 and the tubular part 43 of the cover 40 to reduce the dimension of the electromagnetic valve 1 in the radial direction. Thus, the electromagnetic valve 1 reduced in size in the radial direction can be provided. When further miniaturization of the electromagnetic valve 1 is required, adoption of the solenoid 20 of the aforementioned embodiment is more effective.

The solenoid 220 of the second embodiment has a structure in which the coils are wound between the flat surfaces (the first lateral surfaces 221c and the flange parts 225b). For this reason, the solenoid 220 of the second embodiment makes work for winding the coils 28 easy, compared to the solenoid 20 of the embodiment. That is, the solenoid 220 of the second embodiment realizes predetermined miniaturization with respect to the solenoid 120 of the comparative example, and realizes high productivity compared to the solenoid 120 of the comparative example.

The various embodiments have been described, but the constitutions in each embodiment and a combination thereof are one example, and additions, omissions, substitutions, and other modifications of the constitution are possible without departing from the spirit of the present invention.

For example, in each of the aforementioned embodiments, the number of the plurality of tooth parts is not particularly restricted, and may be two, or four or more. The tooth parts may be separate members independent of the ring part.

The cylindrical part (or the tubular part) and the bobbin parts constituting the insulator may be separate members. Further, the tooth envelopment part and the flange part constituting each of the bobbin parts may be separate members.

What is claimed is:

1. An electromagnetic valve, comprising:
    a solenoid having a tubular guide part having the same center as a central axis extending in an axial direction;
    a movable element located inside the guide part in a radial direction and configured to move in the axial direction;
    a cover configured to house the solenoid and the movable element, having a hole portion, and made of a magnetic material;
    a pin located at the hole portion and configured to move along with movement of the movable element; and
    a valve section provided outside the cover and opened/closed along with movement of the movable element and the pin,
    wherein the movable element has a permanent magnet having magnetic poles different from each other in the axial direction, and a pair of yokes disposed at opposite sides of the permanent magnet in the axial direction,
    the solenoid has a cylindrical part in which the guide part is provided for an inner circumferential surface thereof, a plurality of tooth parts that extend outward from the cylindrical part in the radial direction and are made of a magnetic material, bobbin parts provided for the respective tooth parts, and coils wound around the bobbin parts, and
    each of the bobbin parts has a flange part bent along an outer circumferential surface of the cylindrical part in an arcuate shape.

2. The electromagnetic valve according to claim 1, wherein:
    the cover has a tubular part that covers the solenoid from an outside in the radial direction; and
    the flange parts are bent along an inner surface of the tubular part in an arcuate shape.

3. The electromagnetic valve according to claim 1, wherein the solenoid has three or more coils disposed at regular intervals in a circumferential direction of the cylindrical part.

4. The electromagnetic valve according to claim 1, wherein the tooth parts pass through the flange parts to come into contact with the cover.

5. The electromagnetic valve according to claim 1, wherein inner ends of the tooth parts in the radial direction are connected in a circumferential direction.

6. The electromagnetic valve according to claim 1, wherein the movable element, the inner and outer circumferential surfaces of the cylindrical part, and the flange parts, are disposed in a concentric shape when viewed in the axial direction.

7. The electromagnetic valve according to claim 1, wherein the flange parts have shapes rounded with no angle when viewed in directions in which the tooth parts extend.

8. The electromagnetic valve according to claim 1, wherein the cover has a pair of plates located at respective ends of the solenoid in the axial direction.

* * * * *